United States Patent
Kim et al.

(10) Patent No.: US 11,304,089 B2
(45) Date of Patent: Apr. 12, 2022

(54) V2X COMMUNICATION DEVICE AND DCC OPERATION METHOD THEREOF

(71) Applicant: LG Electronics Inc., Seoul (KR)

(72) Inventors: Jinwoo Kim, Seoul (KR); Woosuk Ko, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/765,012

(22) PCT Filed: Oct. 23, 2018

(86) PCT No.: PCT/KR2018/012548
§ 371 (c)(1),
(2) Date: May 18, 2020

(87) PCT Pub. No.: WO2019/103322
PCT Pub. Date: May 31, 2019

(65) Prior Publication Data
US 2020/0359257 A1 Nov. 12, 2020

Related U.S. Application Data

(60) Provisional application No. 62/590,359, filed on Nov. 23, 2017.

(51) Int. Cl.
*H04W 28/02* (2009.01)
*H04W 4/40* (2018.01)
(Continued)

(52) U.S. Cl.
CPC ......... *H04W 28/0289* (2013.01); *H04W 4/40* (2018.02); *H04W 72/02* (2013.01); *H04W 74/0808* (2013.01); *H04W 92/18* (2013.01)

(58) Field of Classification Search
CPC ... H04W 28/02; H04W 28/0289; H04W 4/40; H04W 72/02; H04W 74/0808; H04W 84/005; H04W 92/18
See application file for complete search history.

(56) References Cited

U.S. PATENT DOCUMENTS

| 2020/0128470 A1* | 4/2020 | Mok | H04W 40/14 |
| 2020/0374862 A1* | 11/2020 | Wang | H04W 72/085 |
| 2021/0160728 A1* | 5/2021 | Jung | H04L 5/0053 |

FOREIGN PATENT DOCUMENTS

| WO | 2016079320 | 5/2016 |
| WO | 2017171529 | 10/2017 |

OTHER PUBLICATIONS

Math, Chetan Belagal et al., "V2X Application-Reliability Analysis of Data-Rate and Message-Rate Congestion Control Algorithms," In: IEEE Communications Letters, Jun. 2017, vol. 21, No. 6, pp. 1285-1288, see pp. 1285-1286.

(Continued)

*Primary Examiner* — Kashif Siddiqui
(74) *Attorney, Agent, or Firm* — Dentons US LLP

(57) ABSTRACT

A decentralized congestion control (DCC) operation method of a V2X communication device is disclosed. The DCC operation method of a V2X communication device comprises the steps of: receiving a first transmission packet; acquiring first channel busy ratio (CBR) shared information included in the first transmission packet; and performing a DCC operation on the basis of the first CBR shared information and/or measured local CBR information.

7 Claims, 8 Drawing Sheets

(51) Int. Cl.
*H04W 72/02* (2009.01)
*H04W 74/08* (2009.01)
*H04W 92/18* (2009.01)

(56) References Cited

OTHER PUBLICATIONS

Autolitano, Alessia et al., "Understanding the Channel Busy Ratio Metrics for Decentralized Congestion Control in VANETs," In: 2014 International Conference on Connected Vehicles and Expo (ICCVE), Oct. 15, 2015, pp. 717-722, see pp. 717-718, 722.
Kuhlmorgen, Sebastian et al., "Evaluation of Multi-Hop Packet Prioritization for Decentralized Congestion Control in VANETs," In: 2017 IEEE Wireless Communications and Networking Conference (WCNC), May 11, 2017, pp. 1-6, ISSN 1558-2612, see pp. 1-6.

\* cited by examiner

[Figure 1]
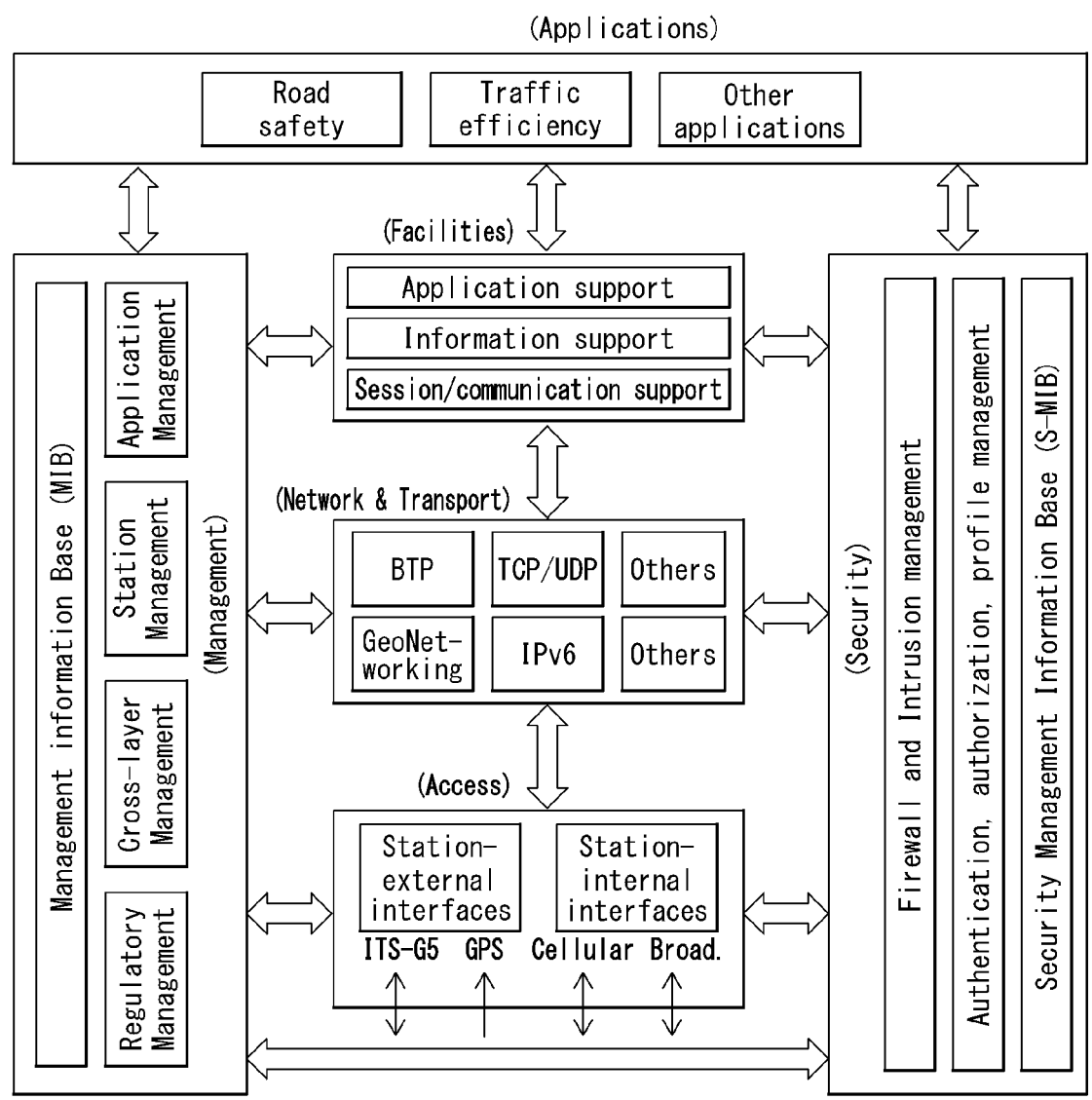

【Figure 2】
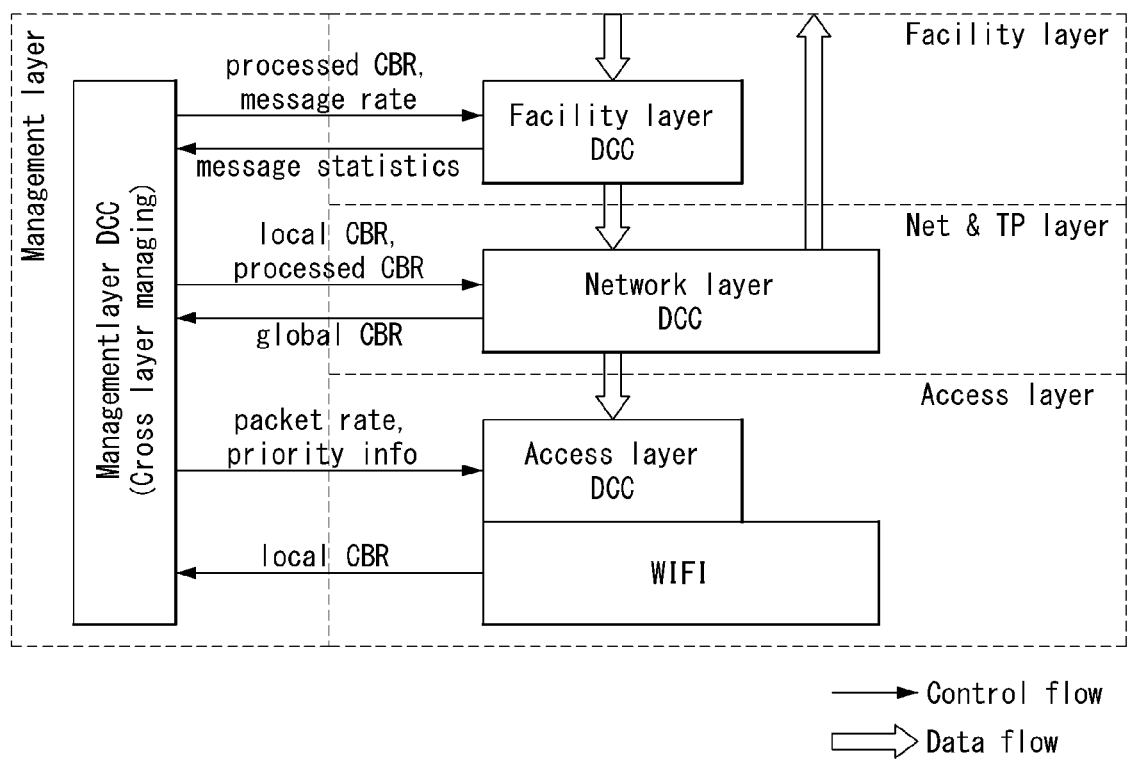

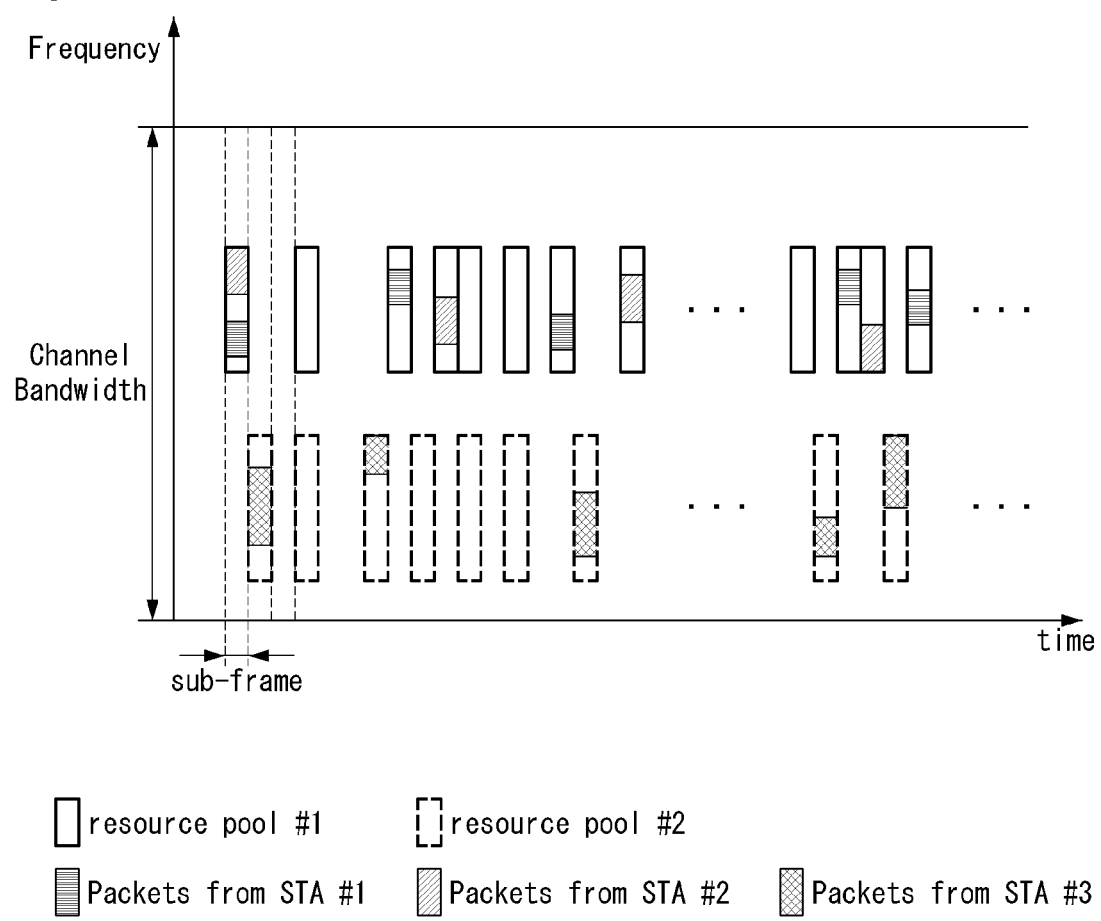
[Figure 3]

[Figure 4]
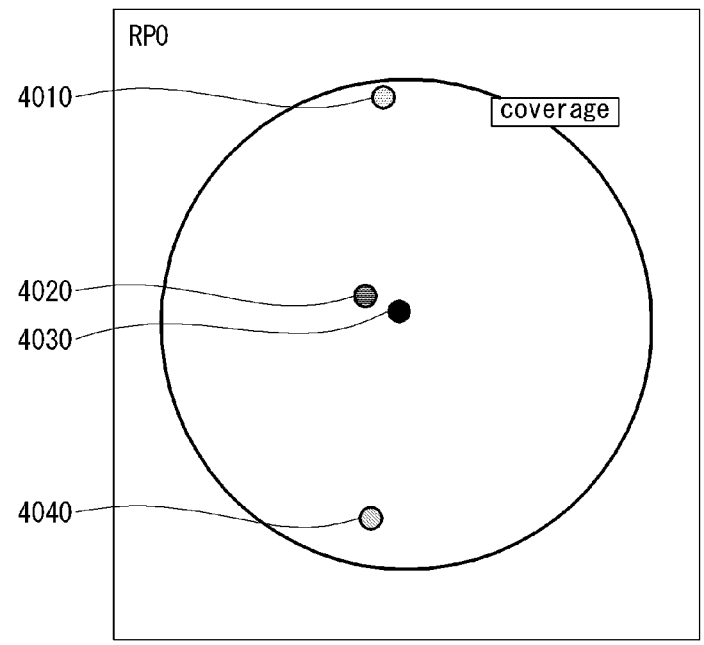
(A) without Geo-Zoning
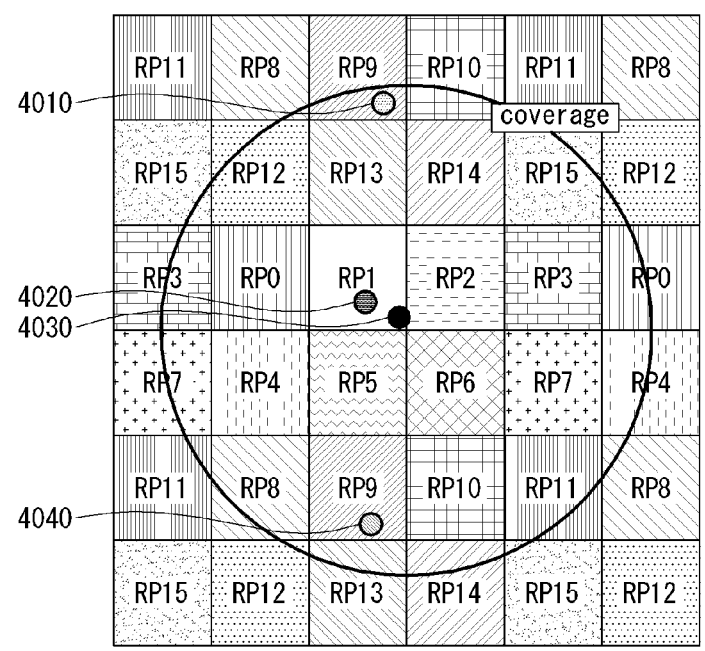
(B) with Geo-Zoning

[Figure 5]
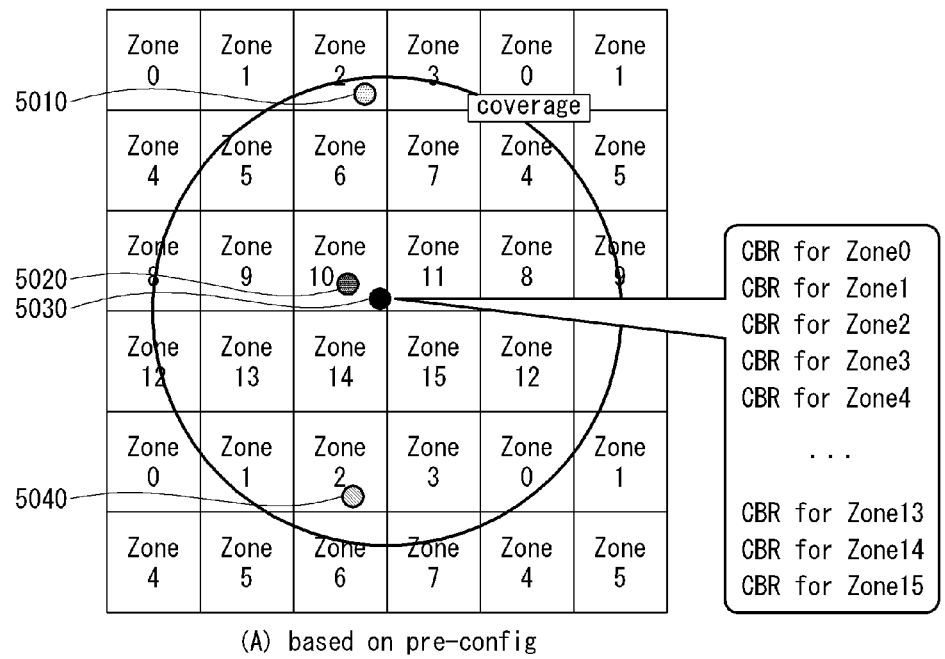
(A) based on pre-config
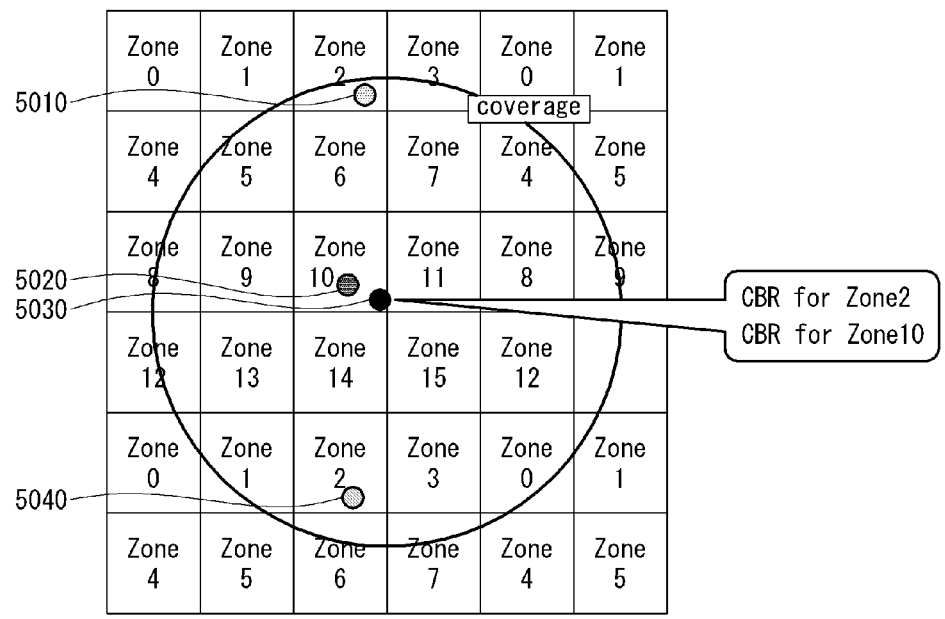
(B) based on the received packet

[Figure 6]
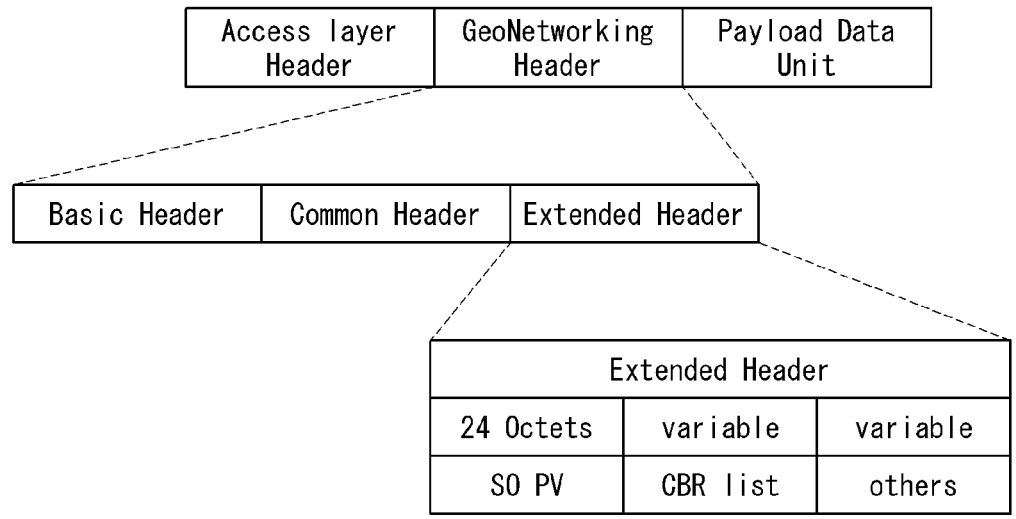
CBR list
| Field Name | Field Size (Octets) | Type | Description |
|---|---|---|---|
| CBR count | 4 | unsigned integer | The Number of RPs |
| CBR-ID | 4 | unsigned integer | RP-ID or Zone-iD |
| CBR_L_0_Hop | 8 | unsigned integer | local CBR measured by ego station |
| CBR_L_1_Hop | 8 | unsigned integer | maximum among CBRs received from neighboring stations |
CBR loop

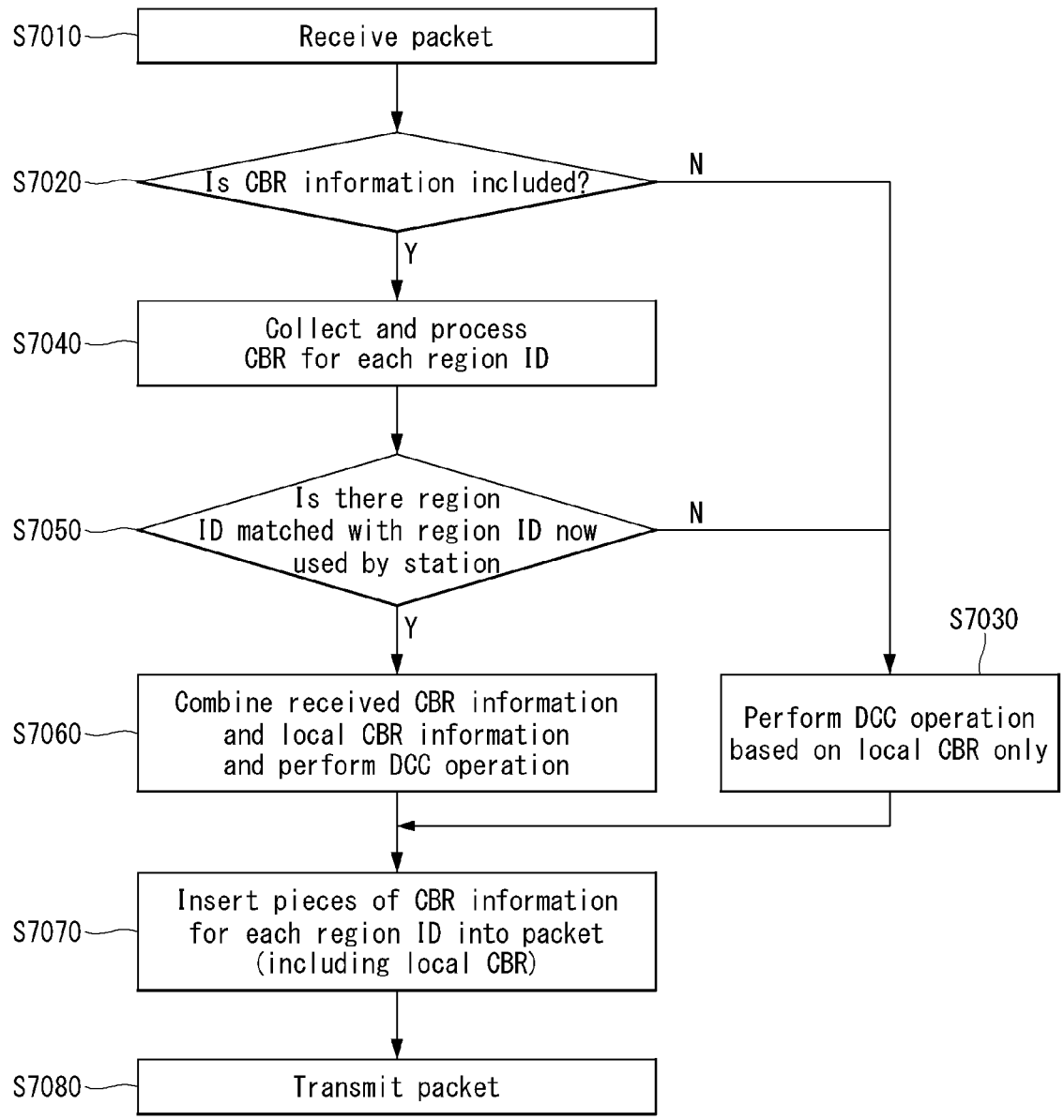
[Figure 7]

[Figure 8]
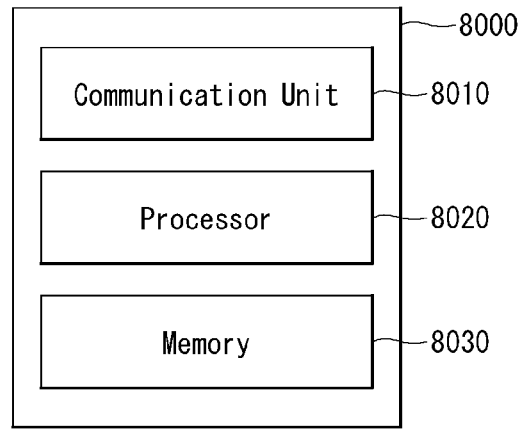
V2X Communication Device
[Figure 9]
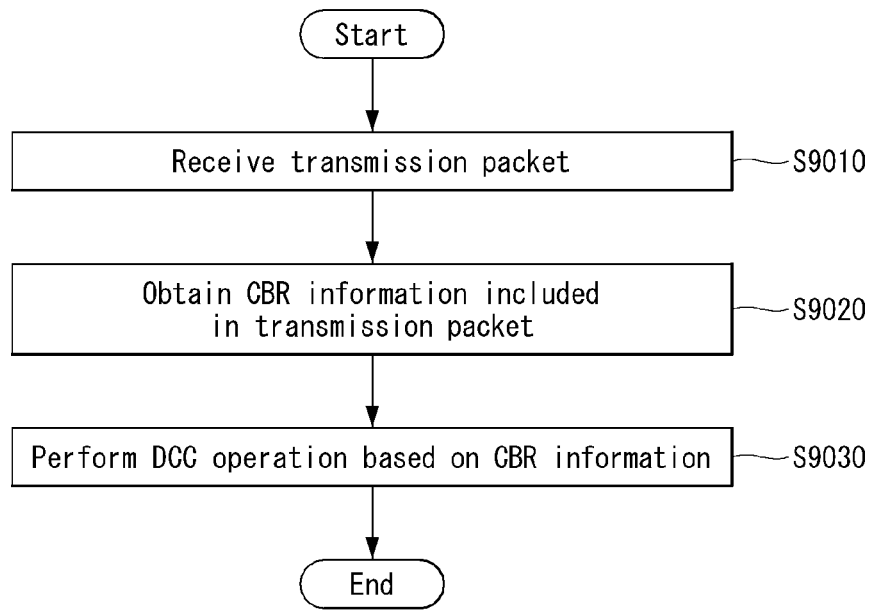

V2X COMMUNICATION DEVICE AND DCC OPERATION METHOD THEREOF

This application is the National Stage filing under 35 U.S.C. 371 of International Application No. PCT/KR2018/012548, filed on Oct. 23, 2018, which claims the benefit of U.S. Provisional Application No. 62/590,359 filed on Nov. 23, 2017, the contents of which are all hereby incorporated by reference herein in their entirety.

TECHNICAL FIELD

The present disclosure relates to a channel busy ratio (CBR) sharing method for an efficient cross-layer decentralized congestion control (DCC) operation according to a geo-zoning scheme application in V2X communication.

BACKGROUND ART

Recently, a vehicle is becoming the results of a complex industry technology in which electrical, electronic, and communication technologies have been converged out of mechanical engineering. In this aspect, the vehicle is called a smart car. The smart car has provided various user-customized mobile services in addition to vehicle technologies having the existing meaning, such as traffic safety/congestion solution, by connecting a driver, the vehicle, and traffic infrastructure. Such connectivity may be implemented using a vehicle to everything (V2X) communication technology.

In the future transportation system, a vehicle (OBE), road side devices (RSE), and non-vehicle participants around a road share an ego state and information obtained around an ego vehicle. The sharing of the information is performed using a V2X communication technology based on an ad-hoc technology. The V2X communication technology has been developed to increase resource utilization efficiency in the entire transportation system position by optimizing resource consumption (e.g., traffic jam) occurring on a road in addition to a safety-related purpose.

DISCLOSURE

Technical Problem

CBR information shared with other stations through the network layer is configured by taking into consideration a channel reception environment in a station position that receives a packet in addition to a station that transmits the packet and for congestion control from the viewpoint of all stations participating V2V communication. Accordingly, the channel usage degree of all the stations within a range in which a transmission packet can be received needs to be taken into consideration.

Technical Solution

A DCC operation method of a V2X communication apparatus according to an embodiment of the present disclosure includes receiving a first transmission packet, obtaining first channel busy ratio (CBR) sharing information included in the first transmission packet, and performing a decentralized congestion control (DCC) operation based on at least one of the first CBR sharing information or measured local CBR information, wherein the DCC operation is performed by controlling at least one of a packet transfer rate, a packet size or packet transmit power.

In the DCC operation method of a V2X communication apparatus according to an embodiment of the present disclosure, the CBR sharing information includes at least one of CBR count information indicating the number of resource pools, CBR ID information indicating a resource pool ID or zone ID corresponding to a CBR value, or CBR information corresponding to the CBR ID.

In the DCC operation method of a V2X communication apparatus according to an embodiment of the present disclosure, the CBR information includes at least one of first CBR information measured by a V2X communication apparatus that has transmitted the CBR sharing information or second CBR information corresponding to a maximum value of CBR values received by the V2X communication apparatus that has transmitted the CBR sharing information.

The DCC operation method of a V2X communication apparatus according to an embodiment of the present disclosure further includes generating a second transmission packet including second CBR sharing information including the measured local CBR information, and transmitting the second transmission packet.

In the DCC operation method of a V2X communication apparatus according to an embodiment of the present disclosure, the second CBR sharing information includes CBR information for all of pre-defined resource pools.

In the DCC operation method of a V2X communication apparatus according to an embodiment of the present disclosure, the second CBR sharing information includes CBR information for at least one zone ID or resource pool ID indicated by at least one transmission packet received for a specific time.

Advantageous Effects

According to the present disclosure, DCC performance of the entire network is improved because CBR value is shared by all stations within coverage. Furthermore, a DCC operation can be performed based on the area of a moving station because a CBR value is shared based on a zone/resource pool. Various effects of the present disclosure are described below again.

DESCRIPTION OF DRAWINGS

The accompany drawings which are included for further understanding of the present disclosure and included in the present application and which form part of the present disclosure illustrate embodiments of the present disclosure along with the detailed description that describes the principle of the present disclosure.

FIG. 1 illustrates reference architecture of an intelligent transport system (ITS) station according to an embodiment of the present disclosure.

FIG. 2 illustrates a DCC operation according to an embodiment of the present disclosure.

FIG. 3 illustrates a resource management method of long term evolution (LTE)-V2X according to an embodiment of the present disclosure.

FIG. 4 illustrates a geo-zoning technology according to an embodiment of the present disclosure.

FIG. 5 illustrates a CBR sharing method in geo-zoning according to an embodiment of the present disclosure.

FIG. 6 illustrates a packet header structure including CBR information according to an embodiment of the present disclosure.

FIG. 7 illustrates a DCC operation method of a V2X communication apparatus/station according to an embodiment of the present disclosure.

FIG. 8 illustrates the configuration of the V2X communication apparatus according to an embodiment of the present disclosure.

FIG. 9 illustrates a DCC operation method of the V2X communication apparatus according to an embodiment of the present disclosure.

BEST MODE

Preferred embodiments of the present disclosure are specifically described, and examples thereof are illustrated in the accompanying drawings. The following detailed description given with reference to the accompanying drawings is intended to describe preferred embodiments of the present disclosure rather than to describe only embodiments which may be implemented based on embodiments of the present disclosure. The following detailed description includes details in order to provide thorough understanding of the present disclosure, but the present disclosure does not require all such details. In the present disclosure, the following embodiments do not need to be separately used. A plurality of embodiments or all embodiments may be used together, and specific embodiments may be used as a combination.

Most of terms used in the present disclosure have been selected from common terms widely used in a corresponding field, but some terms have been randomly selected by the applicant and meanings thereof are described in detail in the following description, if necessary. Accordingly, the present disclosure should be understood based on an intended meaning of a term not the name or meaning of the term.

The present disclosure relates to a V2X communication apparatus. The V2X communication apparatus is included in an intelligent transport system (ITS) system, and may perform some of or all functions of the ITS system. The V2X communication apparatus may perform communication between a vehicle and a vehicle, a vehicle and infrastructure, a vehicle and a bicycle, and mobile devices. The V2X communication apparatus may be abbreviated as a V2X apparatus. In an embodiment, the V2X apparatus may correspond to the on board unit (OBU) of a vehicle or may be included in the OBU. The OBU may be denoted as an on board equipment (OBE). The V2X apparatus may correspond to a road side unit (RSU) of infrastructure or may be included in the RSU. The RSU may be denoted as roadside equipment (RSE). Alternatively, the V2X communication apparatus may correspond to an ITS station or may be included in the ITS station. All of a given OBU, RSU and mobile equipment that perform V2X communication may be denoted as an ITS station or a V2X communication apparatus.

FIG. 1 illustrates reference architecture of an intelligent transport system (ITS) station according to an embodiment of the present disclosure.

In the architecture of FIG. 1, two termination vehicles/users may perform communication over a communication network. Such communication may be performed through the functions of each layer in the architecture of FIG. 1. For example, if a message between vehicles is communicated, in a transmission vehicle and an ITS system thereof, data may be downward transmitted through each layer one layer by one layer. In a reception vehicle and an ITS system thereof, data may be upward transmitted through each layer one layer by one layer. Each of the layers of the architecture of FIG. 1 is described below.

Application layer: the application layer may implement and support various use cases. For example, an application may provide road safety, efficient traffic information, and other applications.

Facility layer: the facility layer may support the effective realization of various user cases defined in the application layer. For example, the facility layer may perform application support, information support, and session/communication support.

Net&TP layer: the Net&TP layer may configure a network for vehicle communication between homogenous/heterogeneous networks using various transport protocols and network protocols. For example, the Net&TP layer may provide Internet access and routing using an Internet protocol, such as TCP/UDP+IPv6. Alternatively, the Net&TP layer may configure a vehicle network using a geographical position-based protocol, such as a basic transport protocol (BTS)/Geonetworking.

Access layer: the access layer may transmit, through a physical channel, a message/data received from a higher layer. For example, the access layer may perform/support data communication based on the IEEE 802.11 and/or 802.11p standard-based communication technology, an ITS-G5 wireless communication technology based on the physical transmission technology of the IEEE 802.11 and/or 802.11p standard, the 2G/3G/4G (LTE)/5G wireless cellular communication technology including satellite/wideband wireless mobile communication, a wideband terrestrial wave digital broadcast technology such as DVB-T/T2/ATSC, a GPS technology, and an IEEE 1609 WAVE technology.

The ITS architecture may further include an additional management layer and security layer.

In the present disclosure, V2X communication apparatuses performing V2X communication may be denoted as a V2X apparatus, an ITS station, a station, etc.

Congestion control is a technology/method for controlling, by each station, the amount of channel use in order to improve transmission efficiency in an environment in which a plurality of stations shares the same channel. If a central station having a control right to stations participating in channel use is present, the central station may adjust the amount of channel use of each station based on conditions. However, in the V2X communication of an ITS station, the presence of such a central station is not guaranteed. Stations control channel use using the same right, and this is called decentralized congestion control (DCC).

ITS-G5 uses a WIFI-based access technology. Accordingly, channel busy based on time division multiplexing access (TDMA) may be assumed. Each of all stations participating in channel communication within a given time interval calculates a channel load (CL)/channel load by measuring a message packet transmission period.

The channel load may be indicated as a channel busy ratio (CBR) or a local CBR. The station may predict the transmission time interval of a transmission packet by measuring an energy level generated upon message transmission or analyzing signaling inserted into a packet preamble.

CBR value/information is traffic load state information defined by a monitoring interval ratio to the busy interval of a channel. The CBR information may be used to determine a channel busy state for vehicles within the same network. The channel busy ratio (CBR) information may indicate a time-dependent value of 0 or more to 1 or less indicative of a fraction of time when a correspond channel is busy.

FIG. 2 illustrates a DCC operation according to an embodiment of the present disclosure.

In FIG. 2, an ITS station is a structure in which cross-layer DCC operates. A layer in which DCC operates includes a management layer, a facility layer, a network layer and an access layer. The access layer includes a WIFI block and an access layer DCC block (Access layer DCC) functions to reinforce a DCC-related function.

The management layer DCC (Management layer DCC) exchanges blocks and control information of all layers participating a DCC operation, and may control an overall operation. The facility layer generates a message based on an application or service operated in a higher layer. The facility layer DCC block (Facility layer DCC) may control a generation period for each message. The Net&TP layer packetizes a message downloaded from a higher layer or extracts a message from a received packet and forwards the message to a higher layer. The network layer DCC may load CBR information, measured by an ego station, onto a transmission packet or may extract CBR information of a surrounding station included in a received packet. The access layer may load the packet of a higher layer onto a signal frame transmitted through a channel or may extract a packet from a received signal frame. The access layer DCC may adjust the transmission timing of a packet transmitted by a higher layer based on a channel state. The measurement of a channel load or CBR may be performed in the WIFI block.

DCC control signals exchanged between the management layer DCC and another DCC block may include message generation-related state information (priority for each message) from the facility layer DCC, maximum message generation frequency information or CBR information based on a message generation request frequency, etc. The CBR information does not mean only a local CBR measured in the access layer. CBR information may indicate global CBR information provided by a surrounding station. Alternatively, the CBR information may indicate CBR information generated using both local CBR information and global CBR information in order to improve the stability of a channel use.

The management layer DCC receives control information from the network layer DCC. The control information includes global CBR information. The global CBR information may be CBR information measured by a surrounding station or may be CBR information which is generated by receiving it from another surrounding station and loaded onto a packet and transmitted.

The network layer DCC receives local CBR information or generated CBR information of an ego station, which is loaded onto a transmission packet from the management layer DCC. The WIFI block provides the management layer DCC with periodically measured local CBR information. The access layer DCC is provided with the transmit rate of a packet or priority for each packet, for determining a period for including a packet in a frame by the management layer DCC. The WIFI block may operate based on the 802.11 standard technology. The WIFI block may correspond to a communication unit or may be included in the communication unit.

An ITS station includes transmit rate control for controlling a message/packet transmit rate, transmit data-rate control for controlling the size of a message/packet, and transmit power control for controlling the arrival distance of a transmission signal in the access layer using a method of performing DCC. In the present disclosure, transmit rate control is described.

FIG. 3 illustrates a resource management method of long term evolution (LTE)-V2X according to an embodiment of the present disclosure.

In LTE-V2V, since orthogonal frequency-division multiple access (OFDMA) or SC-FDMA data is transmitted, transmission data is independently allocated to an allocated resource in a frequency axis/time axis for each station. The LTE-V2V technology defines a given resource group called a transmit resource pool. A specific station limitedly manages a time axis and frequency axis range of resources allocated for packet transmission.

In the embodiment of FIG. 3, a station #1 and a station #2 may transmit packets in a resource pool #1, and a station #3 may transmit packets in a resource pool #2. Data transmitted by a specific station is distributed in the time axis and frequency axis.

In a resource pool-based OFDMA structure, unlike in a TDMA structure, a channel load (CL) needs to be measured by taking into consideration the size of resources distributed in the frequency axis and time axis. In the LTE-V2X technology, a given station calculates a local CBR by measuring whether resources within a resource pool positioned within a specific time are busy. Thereafter, the station selects a resource which may be transmitted next.

Packets transmitted by a higher layer are allocated to the selected resource and transmitted. The amount of packets that may be allocated may be determined based on the measured local CBR information. That is, when a local CBR value is high, a resource is allocated to only a small amount of packets. When a local CBR value is low, a resource is allocated to a relatively large amount of packets and transmitted through a channel. The amount of packets transmitted based on a local CBR value needs to be identically applied to stations participating in V2V in a given area. Accordingly, the amount of packets may be configured through another network (e.g., cellular network) or may be previously stored in an LTE-V2X module.

FIG. 4 illustrates a geo-zoning technology according to an embodiment of the present disclosure.

In the case of the LTE-V2X technology, a plurality of stations may transmit packets in the same resource pool. Packet data transmitted by two stations within one subframe may be allocated to a resource. For example, if one of two stations is located at a distance very close to a reception station STA-1 and the other thereof is located at a distance very far from a reception station STA-2, the signal level of the STA-1 is much greater than the signal level of the STA-2 in terms of propagation attenuation. Accordingly, if a multiplexed signal is received by the auto gain control (AGC) of a receiver based on the STA-1, the decoding of a packet transmitted by the STA-2 may be almost impossible. This is called a near-far problem in the LTE-V2X system. This may fatally function in V2V communication operating in various geographical situations. In the case of V2V communication, in a road-safety problem, when a handling time is taken into consideration after a message is received, a message received from a distant station rather than an adjacent station may be more important. The LTE-V2X system solves this problem using a geo-zone/geo-zoning scheme.

FIG. 4(*a*) is an embodiment when geo-zoning is not used. A plurality of stations located within the reception range of a third station 4030 transmits packets in the same resource pool RPO. In this case, if a received signal is decoded based on the signal intensity of a second station 4020, the signal of a fourth station 4040 having a long distance may not be received/decoded.

FIG. 4(b) is an embodiment when geo-zoning is used. In the case of FIG. 4(b), a geographical region is partitioned into a plurality of zones by geo-zoning. A section having a square form to which a resource pool has been assigned is called a zone. The zone may be defined in various manners. In an embodiment, the zone may be defined using at least one of parameters, such as a latitude direction length, a longitude direction length, a latitude direction repetition period, and a longitude direction repetition period.

A letter indicated in each zone is an identifier for describing a mapping relation between a V2X resource pool and a corresponding zone. A first station 4010 and a fourth station 4040 ≙ the same resource pool RP9. Furthermore, a second station 4020 and a third station 4020 uses the same resource pool RP1.

Resource pools repeatedly allocated in the width and length direction are disposed in each zone. In the embodiment of FIG. 4(b), four resource pools in the width direction and four resource pools in the length direction are periodically allocated to zones.

Stations using an RP9 are located in different zones, but the two stations 4010 and 4040 using the RP9 do not cause the near-far problem because a relative distance difference between the stations is not great based on the location of the reception station 4030. Geo-zoning may be defined based on absolute coordinates (latitude, longitude) on the earth. Furthermore, the width direction length and length direction length of a zone, a repetition period to which a zone and resource pool are mapped, etc. may be separately defined for each area by taking into consideration a regional environment in which communication is performed.

CBR information (local CBR/global CBR) shared with other stations through the aforementioned network layer is designed in order to take into consideration the reception environment of a channel in a station standpoint that receives a packet in addition to a station that transmits the packet and to optimize a congestion control operation from the viewpoint of all stations participating in V2V communication. Accordingly, it is important to share the channel usage degree of all stations within the range in which a transmission packet can be received.

In LTE-V2X-based V2V communication, as described above, in view of the characteristic in which a transmission resource within a resource pool is allocated, a local CBR is measured only within the resource pool of an ego station and used. In an environment in which the reception range of a station is divided and operated into a plurality of zones, CBR information included in a transmission packet may be validly used for only a station that shares the same resource pool, that is, stations having a very close distance. In the embodiment of FIG. 4(b), when the third station 4030 transmits CBR information for an RP1, stations that may receive the CBR information and use it for a DCC operation are only stations using the RP1. A zone in which the RP1 is used within the transmission range of the third station 4030 is very close to the third station within the transmission range. For example, it is expected that a deviation between the CBRs of the third station 4030 and the second station 4020 is not great. Accordingly, a DCC operation effect according to CBR sharing may be reduced.

In the LTE-V2X system, a station may transmit the packet of an ego station within a resource pool, but needs to decode all packets on all the resource pools in order to receive all the packets broadcasted by surrounding stations. This is a reception processing procedure of a packet. A reception state (received energy level) of all resource elements within a channel may be determined by processing for decoding all resources present in the frequency axis and the time axis within the channel. A CBR value for each resource pool can be obtained by collecting and analyzing reception states for each received resource element for each pre-defined resource pool. As described above, a CBR value obtained for each resource pool may be shared with surrounding stations. A method of selecting a resource pool for CBR calculation and sharing may include the following method.

(1) Method of updating and calculating a CBR value for all resource pools predefined in relation to a zone. The predefined resource pools may include a set of resource pools stored within RRC.

(2) Method of determining a location for each station through packets transmitted by surrounding stations and calculating and transmitting only the CBRs of resource pools for zones in which stations present at current timing within a reception range are located As described above, since a geographical zone and a resource pool are mapped, the method (2) of calculating a CBR for some zones within an LTE-V2X reception range has an advantage in the computing power or transmission data redundancy aspect. However, the method may be affected by time delay occurring in a process of reading and feeding back location information from information transmitted by surrounding stations.

FIG. 5 illustrates a CBR sharing method in geo-zoning according to an embodiment of the present disclosure.

In FIG. 5, a zone ID is indicated in a square zone. A unique resource pool is designated to a zone having each ID. That is, in zones having the same zone ID, a packet is transmitted using the same resource pool.

FIG. 5(a) illustrates a method of calculating and transmitting CBR values for all resource pools defined for all predefined zones. A station may generate and share CBR information based on a predefined zone parameter. Zones defined in FIG. 5(a) are 16 zones of a zone 0 to a zone 15. Accordingly, a station shares a total of 16 CBR values. If CBRs are received and calculated for each zone from surrounding stations, CBRs in the same zone is updated as the latest CBR. A station transmits/shares, to the surroundings, CBR information for the 16 zones that have been updated and calculated as described above.

FIG. 5(b) illustrates a method of determining a zone (zone in which stations are located at current timing) including valid CBR sharing while viewing packets received from surrounding stations and sharing only a CBR for a corresponding zone. In FIG. 5(b), stations are located in a zone2 and a zone 10. Accordingly, a transmission station transmits/shares two CBR values for the zone 2 and the zone 10.

An effect when a station sharing a CBR does not share the CBR based on the resource pool of an ego station and shares the CBR based on a surrounding station or a predefined resource pool is as follows. A station 5030 located at the center of FIG. 5(b) transmits a packet in a resource pool allocated to the zone 10. If a local CBR measured by the station 5030 is shared, a station 5020 using the same resource pool present within a transmission range may perform DCC using the same resource pool. However, since the distance between the two stations is very close, CBR values of the two stations may be very similar, and thus the effect of CBR sharing between the two stations may be reduced.

However, in FIG. 5(b), if the third station 5030 at the center measures a local CBR for the zone 2 and shares the measured CBR, the CBR includes CBR information for a resource pool used by a first station 5010 and a fourth station 5040. For example, a zone to which the first station 5010 belongs is very congested, but a zone to which the fourth station 5040 belongs may not be congested. In this case, the fourth station 5040 transmits data in a resource pool, but it is difficult for the third station 5030 to properly receive the packet of the first station 5010 due to the fourth station 5040. Accordingly, the DCC effect is increased from the viewpoint of a station that receives a packet only when CBR information of stations to which the same zone ID (or resource pool ID) has been allocated within a transmission range is shared.

From the viewpoint of a resource pool, another effect of sharing a CBR occurs when a station continues to move in view of the characteristics of a vehicle. If a DCC operation is performed based on a local CBR measured by a station, the local CBR is measured while resource pools are repeatedly changed at the end of a specific zone. As a result, there is a problem in that a value becomes inaccurate. A station that moves while continuously crossing a geo-zone repeatedly performs a DCC operation based on an inaccurate CBR. Accordingly, if an ego station previously receives CBR information of a path along which the ego station moves from other stations and applies the CBR information, the ego station can perform a more stable and effective DCC operation.

In the aforementioned description related to FIG. 5, a case where one resource pool has been allocated for each zone has been described, but the method of the present disclosure may be identically applied to a case where a plurality of resource pools is allocated for each zone.

The number of zones and the number of resource pools may not be the same according to an operation method of geo-zoning. A plurality of resource pools may be mapped to the same zone, and a plurality of zones may be defined to share one resource pool. Accordingly, in a resource pool recognition method according to geo-zoning, a zone ID and a resource pool ID are meaningful values.

The LTE-V2X system measures a local CBR in a resource pool range used by an ego station for packet transmission, and performs DCC of a transmission packet using the local CBR. Accordingly, in an environment to which geo-zoning has been applied, if a CBR is forwarded to a surrounding station, what the CBR corresponds to CBR information for which resource pool needs to be also indicated. To this end, the following two methods may be used.

(1) If a parameter for operating a resource pool is received from the outside and stored, a resource pool ID is also assigned. The parameter is information identically obtained by surrounding stations locally. Accordingly, resource pool ID information may be shared along with CBR information. The pieces of information may be stored in RCC and operated.

(2) A zone ID to identify a zone and a resource pool ID may be mapped in a one-to-one manner. In this case, if a zone ID and CBR information are shared, another station can also check to which resource pool a corresponding CBR corresponds.

In the present disclosure, a resource pool ID or a zone ID may be called an area/region ID.

FIG. 6 illustrates a packet header structure including CBR information according to an embodiment of the present disclosure.

FIG. 6 illustrates an embodiment in which the aforementioned region ID is transmitted in a GeoNetworking header along with a corresponding CBR information/value. In the case of an ITS system based on the WIFI/802.11 technology, if a Geonetworking mode is a single-hop broadcast mode, a station may transmit DCC and multichannel operation (MCO)-related information through a Geonetworking packet header. In the case of LTE-V2X, likewise, CBR information may be transmitted for each region ID.

In the embodiment of FIG. 6, an access header ahead of the GeoNetworking header may include LTE-V2X access-related information. The GeoNetworking header includes headers of three parts, that is, a basic header, a common header, and an extended header. The basic header includes protocol version information and valid time information of the packet. The common header includes a Geonetworking mode, a maximum number of hops, and priority information of a transmission message. The extended header includes station address information for Geonetworking. Furthermore, the extended header includes information that is additionally necessary for each Geonetworking mode.

Information for sharing a CBR may be included in the GeoNetworking header. In an embodiment, information for CBR sharing may be included in the extended header of the GeoNetworking header. Information included in the header for CBR sharing may be called CBR sharing information or a CBR sharing field.

The CBR sharing field may include the following information.

CBR count field: total number information of CBR information for each region ID, which is owned by a station. It may indicate the number of resource pools (RPs) owned by a station.

CBR ID field: a CBR and a resource pool (RP) ID information or zone ID information indicated by the CBR CBR 0 hop field (CBR_L_0_Hop): indicate a local CBR value measured by a station CBR 1 hop field (CBR_L_1_Hop): indicate a maximum value of CBR values received from adjacent stations The CBR 0 hop field and the CBR 1 hop field may be called CBR information. The CBR information may include/indicate at least one of a local CBR or a global CBR. The CBR information may include a CBR representative value calculated using CBR values received from the surroundings. As an embodiment of the CBR representative value, an obtained maximum CBR value, average CBR value or the latest CBR value may be shared.

A Geonetworking packet and other headers are described below.

The Geonetworking packet includes a basic header and a common header according to the protocol of a network layer, and optionally includes an extension header according to a Geonetworking mode. The GeoNetworking header is described again below.

The basic header may be 32 bits (4 bytes). The basic header may include at least one of a version field, a Next Header (NH) field, a LifeTime (LT field), or a Remaining Hop Limit (RHL) field. The fields included in the basic header are described below. A bit size configuring each field is only an embodiment and may be changed.

Version (4 bits): the version field indicates the version of a Geonetworking protocol.

NH (4 bits): the next header (NH) field indicates the type of subsequent header/field. A common header may continue when a field value is 1, and a secured packet may continue when a field value is 2.

LT (8 bits): the LifeTime (LT) field indicates a maximum lifetime of a corresponding packet.

RHL (8 bits): the Remaining Hop Limit (RHL) field indicates the remaining hop restriction. An RHL field value may be reduced by 1 whenever it is forwarded in a GeoAd-hoc router. When an RHL field value is 0, a corresponding packet is no longer forwarded.

The common header may be 64 bits (8 bytes). The common header may include at least one of a NextHeader (NH) field, a HeaderType (HT) field, a Header Sub-Type (HST) field, a Traffic Class (TC) field, a Flags field, a PayloadLength (PL) field, or a Maximum Hop Limit (MHL) field. The fields are described below.

NH (4 bits): the NextHeader (NH) field indicates the type of subsequent header/field. The NH field may indicate not-defined "ANY" type when a field value is 0, may indicate a BTP-A type packet when a field value is 1, may indicate a BTP-B type packet a field value is 2, and may indicate an IP diagram of IPv6 when a field value is 3.

HT (4 bits): the header type field indicates a Geonetworking type. The Geonetworking type includes a beacon, GeoUnicast, GeoAnycast, Geo Broadcast, Topologically-Scoped Broadcast (TSB), and Location Service (LS).

HST (4 bits): the header subtype field indicates a detailed type along with a header type. In an embodiment, if the HT type is configured as a TSB, the header subtype field may indicate a single hop when an HST value is "0", and a multi hop may be designated when an HST value is "1."

TC (8 bits): the traffic class field may include a Store-Carry-Forward (SCF), a channel offload, and a TC ID. The SCF field indicates whether to store a packet if there is no a neighbor to which a packet will be forwarded. The channel offload field indicates that a packet can be forwarded to another channel in the case of a multichannel operation. The TC ID field is a value allocated when a packet is forwarded from the facility layer, and may be used for a contention window value configuration in the physical layer.

Flag (8 bits): the flag field indicates whether an ITS device is a mobile type or a stationary type. In an embodiment, the flag field may be the last 1 bit.

PL (8 bits): the payload length field indicates data length subsequent to the GeoNetworking header in a byte unit. For example, in the case of a Geo-networking packet that carries a CAM, the PL field may indicate the length of a BTP header and CAM.

MHL (8 bits): the Maximum Hop Limit (MHL) field may indicate a maximum hopping number.

The GeoNetworking header includes the aforementioned basic header and common header and extended header. The extended header may have a different configuration depending on a Geonetworking type.

FIG. 7 illustrates a DCC operation method of a V2X communication apparatus/station according to an embodiment of the present disclosure.

In a CBR sharing process for C-V2X, CBR values are transmitted to a surrounding station along with a mapped area/region ID. CBR information included and transmitted in a packet may be directly applied to a DCC operation of a reception station or may be processed for surrounding stations belonging to another zone and transmitted. The operation of the station is described with reference to FIG. 7.

The station receives a packet (S7010). The received packet may include a GeoNetworking header.

When the GeoNetworking header of the received packet does not include CBR information (S7020), the station performs a DCC operation based on a local CBR (S7030). In FIG. 7, the CBR information may correspond to the CBR sharing information described in FIG. 6.

When the GeoNetworking header of the received packet includes CBR information (S7020), the station collects a CBR for each region ID and generates CBR information (S7040). If a region ID matched with a region ID now used by the station is not present (S7050), the station performs a DCC operation based on a local CBR (S7030).

If a region ID matched with a region ID now used by the station is present (S7050), the station performs a DCC operation using both the received CBR information and local CBR information (S7060). The station may combine the received CBR information and the local CBR information and perform the DCC operation (S7060).

In addition to the DCC operation, the station may transmit CBR information. The station may insert CBR information into the packet for each region ID (S7070). The CBR information may include local CBR information for each region ID. The station may transmit a packet including CBR sharing information (S7080).

FIG. 8 illustrates the configuration of the V2X communication apparatus according to an embodiment of the present disclosure.

In FIG. 8, the V2X communication apparatus 8000 may include a communication unit 8010, a processor 8020 and a memory 8030.

The communication unit 8010 may be connected to the processor 8020 and transmit/receive radio signals. The communication unit 8010 may up-convert, into a transmission/reception band, data received from the processor 8020 and transmit the transmission/reception band or may down-convert a received signal. The communication unit 8010 may implement one operation of the physical layer or the access layer.

The communication unit 8010 may include a plurality of sub-RF units in order to perform communication according to a plurality of communication protocols. In an embodiment, the communication unit 8010 may perform data communication based on dedicated short range communication (DSRC), an ITS-G5 wireless communication technology based on the physical transmission technology of the IEEE 802.11 and/or 802.11p standard, a 2G/3G/4G (LTE)/5G wireless cellular communication technology including satellite/wideband wireless mobile communication, a wideband terrestrial wave digital broadcast technology such as DVB-T/T2/ATSC, a GPS technology, or an IEEE 809 WAVE technology. The communication unit 8010 may include a plurality of transceivers implementing respective communication technologies. Furthermore, one of the plurality of transceivers may access a control channel, and the other transceiver may access a service channel.

The processor 8020 is connected to the communication unit 8010, and may implement operations of the layers according to an ITS system or WAVE system. The processor 8020 may be configured to perform operations according to various embodiments of the present disclosure based on the drawings and description. Furthermore, at least one of a module, data, a program or software implementing an operation of the V2X communication apparatus 8000 according to the aforementioned various embodiments of the present disclosure may be stored in the memory 8030 and executed by the processor 8020.

The memory 8030 is connected to the processor 8020 and stores various pieces of information for driving the processor 8020. The memory 8030 may be included in the processor 8020 or positioned outside the processor 8020 and may be connected to the processor 8020 by known means.

The processor 8020 of the V2X communication apparatus 8000 may perform a DCC operation described in the present disclosure. A DCC operation method of the V2X communication apparatus 8000 is described below.

FIG. 9 illustrates a DCC operation method of the V2X communication apparatus according to an embodiment of the present disclosure.

FIG. 9 is another embodiment of the DCC execution method in FIG. 7. Steps not illustrated in FIG. 7 may be additionally performed as in FIG. 9, and the description of FIG. 9 and the description of FIG. 7 may be mutually supplemented/replaced.

The V2X communication apparatus receives a transmission packet (S9010). The transmission packet received by the V2X communication apparatus may include CBR sharing information.

The V2X communication apparatus obtains CBR sharing information included in the transmission packet (S9020). The CBR sharing information may be configured as described in FIG. 6.

The V2X communication apparatus may perform a DCC operation based on the CBR information (9030). The V2X communication apparatus may perform the DCC operation based on at least one of the CBR information included in the CBR sharing information or local CBR information measured by itself. The DCC operation may be performed by controlling at least one of a packet transmit rate, a packet size or packet transmit power.

The CBR sharing information may include at least one of CBR count information indicating the number of resource pools, CBR ID information indicating a resource pool ID or zone ID corresponding to a CBR value, or CBR information corresponding to the CBR ID. The CBR information may include at least one of first CBR information measured by a V2X communication apparatus that has transmitted the CBR sharing information or second CBR information corresponding to a maximum value of CBR values received by the V2X communication apparatus that has transmitted the CBR sharing information. The first CBR information may correspond to local CBR information, and the second CBR information may correspond to global CBR information.

The DCC execution method of the V2X communication apparatus may further include the steps of generating a transmission packet including the CBR sharing information including the local CBR information measured by the V2X communication apparatus and transmitting the generated transmission packet. The CBR sharing information of the transmission packet may include CBR information for all of pre-defined resource pools. Alternatively, the CBR sharing information of the transmission packet may include CBR information for at least one zone ID or resource pool ID indicated by at least one transmission packet received for a specific time.

In the aforementioned embodiments, the elements and characteristics of the present disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements or the characteristics may be combined to form an embodiment of the present disclosure. The sequence of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

Mode for Invention

Those skilled in the art will understand that the present disclosure may be changed and modified in various ways without departing from the spirit or scope of the present disclosure. Accordingly, the present disclosure is intended to include changes and modifications of the present disclosure provided in the attached claims and an equivalent range thereof.

In this specification, both the apparatus and method disclosures have been described, and the descriptions of both the apparatus and method disclosures may be complementarily applied.

The various embodiments have been described in the best form for implementing the present disclosure.

Industrial Applicability

The present disclosure is used in a series of vehicle communication fields.

It is evident to those skilled in the art will understand that the present disclosure may be changed and modified in various ways without departing from the spirit or range of the present disclosure. Accordingly, the present disclosure is intended to include all the changes and modifications provided by the appended claims and equivalents thereof.

The invention claimed is:

1. A decentralized congestion control (DCC) operation method of a V2X communication apparatus, comprising:
receiving, from each of at least one neighboring station, a first transmission packet;
obtaining first channel busy ratio (CBR) sharing information included in the first transmission packet;
based on the first transmission packet, measuring local CBR information on at least one zone, among a plurality of zones, where the at least one neighboring station transmitting the first transmission packet is located;

performing a DCC operation based on at least one of (i) the first CBR sharing information or (ii) the measured local CBR information,
wherein the DCC operation is performed by controlling at least one of a packet transfer rate, a packet size or packet transmit power;
generating a second transmission packet including second CBR sharing information based on (i) the first CBR sharing information and (ii) the measured local CBR information; and
transmitting, to the at least one neighboring station, the second transmission packet.

2. The DCC operation method of claim 1, wherein the CBR sharing information includes at least one of CBR count information indicating a number of resource pools, CBR ID information indicating a resource pool ID or zone ID corresponding to a CBR value, or CBR information corresponding to the CBR ID.

3. The DCC operation method of claim 2, wherein the CBR information includes at least one of first CBR information measured by a V2X communication apparatus that has transmitted the CBR sharing information or second CBR information corresponding to a maximum value of CBR values received by the V2X communication apparatus that has transmitted the CBR sharing information.

4. A V2X communication apparatus comprising:
a memory storing memory;
a transceiver for transmitting and receiving radio signals; and
a processor configured to control the memory and the transceiver, wherein the processor is configured to:
receive, from each of at least one neighboring station, a first transmission packet,
obtain first channel busy ratio (CBR) sharing information included in the first transmission packet,
based on the first transmission packet, measure local CBR information on at least one zone, among a plurality of zones, where the at least one neighboring station transmitting the first transmission packet is located,
perform a decentralized congestion control (DCC) operation based on at least one of (i) the first CBR sharing information or (ii) the measured local CBR information,
wherein the DCC operation is performed by controlling at least one of a packet transfer rate, a packet size or packet transmit power,
generate a second transmission packet including second CBR sharing information based on (i) the first CBR sharing information and (ii) the measured local CBR information, and
transmit, to the at least one neighboring station, the second transmission packet.

5. The V2X communication apparatus of claim 4, wherein the CBR sharing information includes at least one of CBR count information indicating a number of resource pools, CBR ID information indicating a resource pool ID or zone ID corresponding to a CBR value, or CBR information corresponding to the CBR ID.

6. The V2X communication apparatus of claim 5, wherein the CBR information includes at least one of first CBR information measured by a V2X communication apparatus that has transmitted the CBR sharing information or second CBR information corresponding to a maximum value of CBR values received by the V2X communication apparatus that has transmitted the CBR sharing information.

7. The method of claim 1, wherein CBR information of different neighboring stations assigned a same zone ID is shared between the different neighboring stations.

* * * * *